(12) United States Patent
Nasielski et al.

(10) Patent No.: US 10,382,336 B2
(45) Date of Patent: Aug. 13, 2019

(54) DYNAMICALLY ADJUSTING NETWORK SERVICES STRATUM PARAMETERS BASED ON ACCESS AND/OR CONNECTIVITY STRATUM UTILIZATION AND/OR CONGESTION INFORMATION

(71) Applicant: QUALCOMM Incorporated, San Diego, CA (US)

(72) Inventors: John Wallace Nasielski, San Diego, CA (US); Gavin Bernard Horn, La Jolla, CA (US); Soo Bum Lee, San Diego, CA (US); Stefano Faccin, San Ysidro, CA (US); Jay Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/838,002

(22) Filed: Dec. 11, 2017

(65) Prior Publication Data
US 2018/0102972 A1   Apr. 12, 2018

Related U.S. Application Data

(63) Continuation of application No. 14/866,574, filed on Sep. 25, 2015, now Pat. No. 9,843,517.

(60) Provisional application No. 62/161,878, filed on May 14, 2015.

(51) Int. Cl.
*H04W 28/02* (2009.01)
*H04L 12/24* (2006.01)
*H04L 12/801* (2013.01)

(52) U.S. Cl.
CPC .......... *H04L 47/11* (2013.01); *H04L 41/5025* (2013.01); *H04W 28/0289* (2013.01)

(58) Field of Classification Search
CPC ............. H04W 28/0289; H04W 28/12; H04W 28/0247; H04W 28/0268; H04W 28/16; H04W 28/18; H04W 28/22; H04L 47/11; H04L 47/20; H04L 41/5025;
(Continued)

(56) References Cited

U.S. PATENT DOCUMENTS

| | | | |
|---|---|---|---|
| 7,227,843 B2 | 6/2007 | Belanger et al. | |
| 9,231,774 B2 * | 1/2016 | Cai | ....... H04L 47/748 |
| 9,258,234 B1 | 2/2016 | Addepalli et al. | |

(Continued)

OTHER PUBLICATIONS

Alcatel-Lucent, "Intelligent Traffic Management," 2011, 12 pages.
(Continued)

*Primary Examiner* — Ahmed Elallam
(74) *Attorney, Agent, or Firm* — Loza & Loza, LLP

(57) ABSTRACT

A method, operational at a network device, for conveying congestion information across different strata of a multi-strata network is provided. An indication is obtained that a congestion level for at least one of a radio access network node and a core network node of a network has changed. Consequently, a one or more service parameters for a plurality of services, operating at a service stratum, are updated or adjusted on a per service basis based on the congestion level indication. The one or more service parameters are provided or sent to, at least one of, a node operating at a service stratum or a user device that obtains services over the network.

20 Claims, 8 Drawing Sheets

(58) Field of Classification Search
CPC ............. H04L 41/0681; H04L 43/0811; H04L 43/0876; H04L 47/2491; H04M 15/66
See application file for complete search history.

(56) References Cited

U.S. PATENT DOCUMENTS

| | | | |
|---|---|---|---|
| 9,380,489 B2 | 6/2016 | Kotecha et al. | |
| 9,544,799 B2* | 1/2017 | Okita | H04W 24/08 |
| 9,668,213 B2* | 5/2017 | Salvador | H04W 52/0222 |
| 9,843,964 B2* | 12/2017 | Franklin | H04W 28/22 |
| 10,033,652 B2* | 7/2018 | Koshimizu | H04W 28/0247 |
| 2005/0083912 A1* | 4/2005 | Afshar | H04L 29/06027 |
| | | | 370/352 |
| 2006/0007934 A1 | 1/2006 | Chemiakina et al. | |
| 2007/0174449 A1 | 7/2007 | Gupta | |
| 2008/0186862 A1 | 8/2008 | Corbett et al. | |
| 2008/0212593 A1 | 9/2008 | Niska et al. | |
| 2012/0163203 A1 | 6/2012 | Wilkinson et al. | |
| 2013/0079011 A1 | 3/2013 | Duda | |
| 2014/0064073 A1* | 3/2014 | Sayeedi | H04W 28/12 |
| | | | 370/230 |
| 2014/0369197 A1* | 12/2014 | Stenfelt | H04W 28/0289 |
| | | | 370/235 |
| 2014/0369206 A1 | 12/2014 | Karlsson et al. | |
| 2015/0011182 A1 | 1/2015 | Goldner et al. | |
| 2015/0029879 A1* | 1/2015 | Chou | H04W 4/70 |
| | | | 370/252 |
| 2015/0156666 A1* | 6/2015 | Won | H04W 28/0231 |
| | | | 370/229 |
| 2015/0289167 A1* | 10/2015 | Alex | H04W 28/24 |
| | | | 370/329 |
| 2016/0014632 A1* | 1/2016 | Siow | H04L 5/0085 |
| | | | 370/230 |
| 2016/0100326 A1* | 4/2016 | Chandramouli | H04W 8/26 |
| | | | 370/241.1 |
| 2016/0157253 A1* | 6/2016 | Yamine | H04W 4/90 |
| | | | 455/456.2 |
| 2016/0212653 A1* | 7/2016 | Wang | A61B 10/0051 |
| 2016/0269929 A1* | 9/2016 | Livanos | H04W 28/0289 |
| 2016/0337239 A1 | 11/2016 | Nasielski et al. | |
| 2017/0019750 A1* | 1/2017 | Palanisamy | H04W 28/0289 |
| 2017/0026870 A1* | 1/2017 | Miklos | H04W 28/0289 |
| 2017/0257886 A1* | 9/2017 | Adjakple | H04W 12/08 |
| 2018/0220327 A1* | 8/2018 | Karampatsis | H04W 28/0252 |

OTHER PUBLICATIONS

International Search Report and Written Opinion—PCT/US2016/030267—ISA/EPO—dated Aug. 18, 2016.
Pentikousis K., et al., "Mobile Networks and Management," First International Conference, Monami 2009, Athens, Greece, Oct. 13-14, 2009, 157 pages.

* cited by examiner

DYNAMICALLY ADJUSTING NETWORK SERVICES STRATUM PARAMETERS BASED ON ACCESS AND/OR CONNECTIVITY STRATUM UTILIZATION AND/OR CONGESTION INFORMATION

CLAIM OF PRIORITY

This application claims priority to U.S. Utility application Ser. No. 14/866,574, filed Sep. 25, 2015, titled Dynamically Adjusting Network Services Stratum Parameters Based on Access and/or Connectivity Stratum Utilization and/or Congestion Information, which claims priority to U.S. Provisional Application No. 62/161,878, filed May 14, 2015, titled Efficient Policy Enforcement Using Network Access Tokens For Services C-Plane Approach, the contents of which are incorporated by reference herein.

BACKGROUND

Field

One aspect generally relates to methods of conveying network utilization and/or congestion information from an access stratum and/or connectivity stratum to services operating at a service stratum.

Background

Today there are techniques such as wholesale services, mobile virtual network operator (MVNO), and mobile other licensed operator (MOLO) arrangements, where, for instance, a party may enter into a contract with a connectivity provider or mobile network operator to obtain connectivity services. For example, the party may enter into the contract to obtain bulk access to network services at wholesale rates.

Contracts between service providers providing services at the service stratum and connectivity providers providing connectivity at the connectivity stratum. To establish these contracts a service provider may go to a connectivity provider and may negotiate with the connectivity provider for the types of services the service provider desires. For example, the service provider may need a guaranteed minimum bit rate and guaranteed minimum bandwidth to support its service. Additionally, a connectivity provider may wish to charge higher rates when the network is congested or has high utilization (e.g., to encourage reduction of traffic during those times). Conversely, a service provider may wish to avoid higher charge rates or a congested network, for example, for software upgrades, or other services which can be postponed or routed through a different network.

Up until now, connectivity stratum and/or access stratum congestion and/or utilization information is not available to the service stratum. This has hindered operators of the access/connectivity stratum as well as service stratum providers. For instance, obtaining/providing the current load and congestion information may enable dynamic cost signaling and charging to the service stratum (and optionally the device) and also serve to perform load balancing and congestion management of the connectivity and access strata. Similarly, providers at the service stratum may benefit from obtaining current load/utilization and congestion information as this would permit them to select when software upgrades or other services should be performed over a particular network.

Consequently, a need exists to provide network utilization and/or congestion information from an access/connectivity strata to a service stratum and permit a service provider to dynamically adjust its behavior over the network.

SUMMARY

A first aspect provides a method operational at a network device for dynamically adjusting network services stratum parameters based on a congestion level indication for other network stratum. An indication is obtained that a congestion level for at least one of a radio access network node and a core network node of a network has changed. One or more service parameters for a plurality of services, operating at a service stratum, are updated on a per service basis based on the congestion level indication. In one implementation, updating the one or more service parameters may be performed by a second network device distinct from the network device. In one example, the one or more service parameters may be updated only if the obtained congestion level indication has changed more than a threshold amount from a previously reported congestion level.

The congestion level indication may be based on at least two different types of congestion. For instance, the congestion level indication may be based on at least an access stratum congestion and a connectivity stratum congestion for the network. In another example, the congestion level indication may be based on at least a physical resource congestion for the radio access network node and a control or signaling traffic congestion for the core network node.

The one or more service parameters may then be provided to, at least one of, a node operating at a service stratum or a user device that obtains services over the network. In one example, providing the one or more service parameters may include sending the one or more service parameters in response to a query from the node operating at the service stratum and/or the user device. In various examples, the plurality of services may include two or more of: a voice service, a video service, audio/content streaming service, and a web browsing service.

In one example, updating the one or more service parameters, for the plurality of services, on a per service basis may include: (a) updating a first service parameter for a first service a first amount; and/or (b) updating a second service parameter for a second service a second amount distinct from the first amount.

In one implementation, obtaining the congestion level indication may further include: (a) obtaining a first network congestion report from the radio access network node; (b) obtaining a second network congestion report from the core network node; and/or (c) determining, based on the first network congestion report and the second network congestion report, the congestion level indication. The first network congestion report includes one or more of: supported radio access technologies coverage limits for the network, device capabilities, and/or delivery methods available over the network. The second network congestion report may include one or more of: quality of service information for the network, support for IPv4 and IPv6, network policies, time and usage based limits, and/or security and/or credentials. The network congestion level may only be indicated to the node operating at the service stratum of the network if the determined congestion level indication has changed more than a threshold amount from a previous congestion level indication.

A second aspect provides a network device, comprising: a network interface coupled to a processing circuit. The network interface may serve for communicating over a network. The processing circuit may be configured to: (a) obtain an indication that a congestion level for at least one of a radio access network node and a core network node of a network has changed; (b) update one or more service parameters for a plurality of services, operating at a service stratum, on a per service basis based on the congestion level indication; and/or (c) provide the one or more service parameters to, at least one of, a node operating at a service stratum or a user device that obtains services over the network.

DETAILED DESCRIPTION

Figure 1:
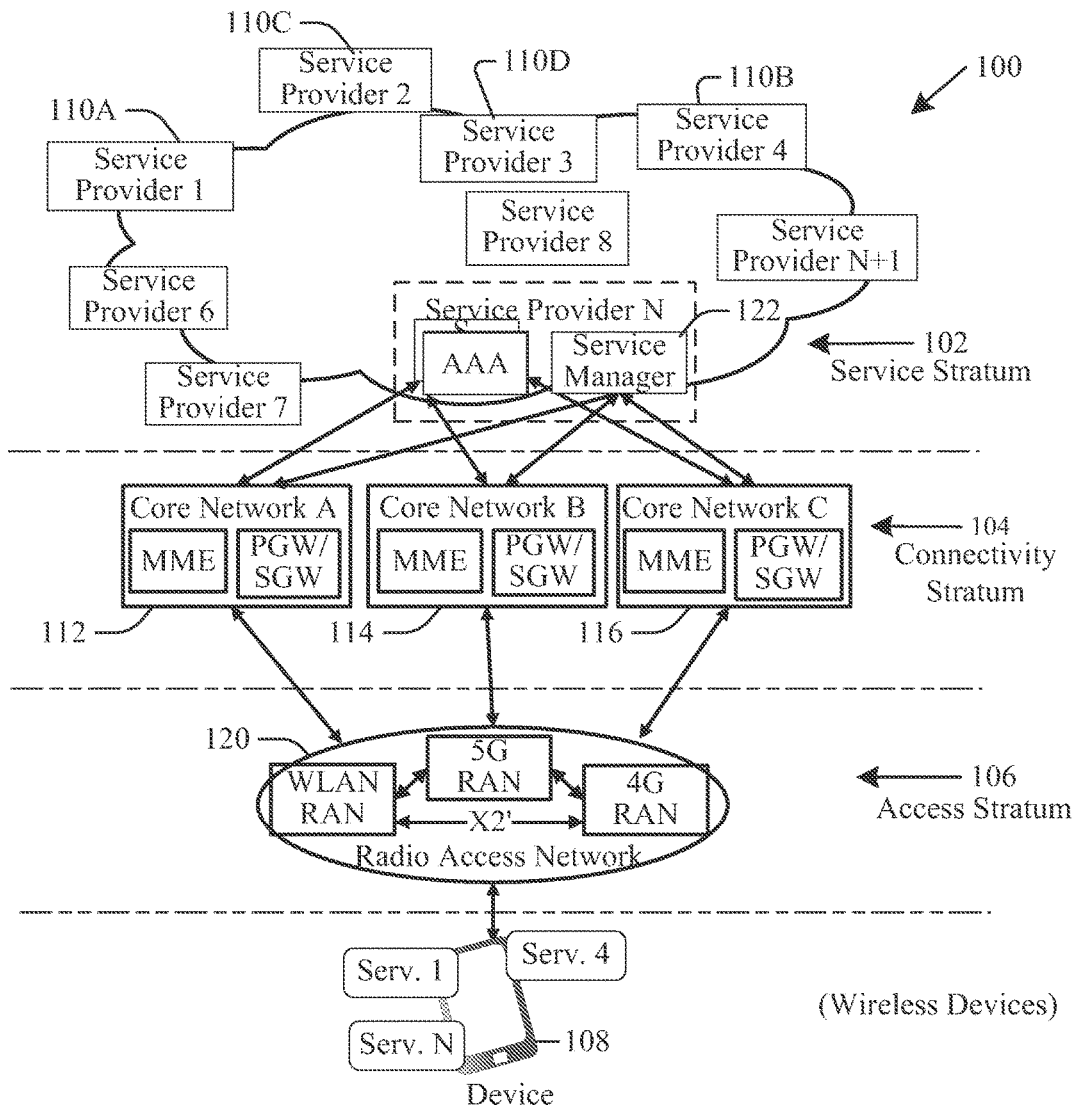
FIG. 1 is a reference wireless network architecture that enables devices to access services where functions are divided across different strata.

In the following description, specific details are given to provide a thorough understanding of the aspects described herein. However, it will be understood by one of ordinary skill in the art that the aspects may be practiced without these specific details. For example, circuits may be shown in block diagrams in order avoid obscuring aspects in unnecessary detail. In other instances, well-known circuits, structures, and techniques may not be shown in detail in order not to obscure the aspects more fully described herein.

The word "exemplary" is used herein to mean "serving as an example, instance, or illustration." Any implementation or aspect described herein as "exemplary" is not necessarily to be construed as preferred or advantageous over other implementations or aspects. The term "aspect" does not require that all aspects include the discussed aspect, or any discussed feature, advantage, and/or mode of operation. For ease of discussion and illustration, the terminology used herein may appear to address LTE; however, the aspects described herein are not intended to be limited to LTE. The aspects described herein are applicable to LTE and beyond LTE, for example 5G. The aspects described herein may also be applicable to networks developed prior to LTE, such as 4G. In fact, the aspects described herein may be employed in today's systems, i.e., systems implemented before standardization of 5G. For example, aspects described herein may be introduced as an addendum to the standards of 4G, LTE, and/or LTE-A networks. Accordingly, all references made to terms that may be associated with 3G, 4G, and/or LTE-A are made only for illustrative purposes and are not intended to limit the scope of any aspect presented herein.

Overview

Network congestion and/or utilization information is provided from an access stratum and/or a connectivity stratum to a service stratum to permit services over a network to be adjusted by a service manager and/or user device. For instance, a service manager and/or user device may dynamically adjust use of one or more networks based on connectivity stratum and/or access stratum congestion information.

According to one aspect, the congestion and/or utilization information may relate to two or more different types of congestions (e.g., congestion occurring at two or more different network strata). In one example, the congestion and/or utilization information relate to an access stratum of a network and a connectivity stratum the network. In another example, such congestion and/or utilization information maybe non-data or non-service traffic, such as control signaling (e.g., at the connectivity stratum) and/or radio resources (e.g., at the access stratum).

Exemplary Network Operating Environment

The term "device" may be used herein to refer to "wireless devices", "mobile devices", "mobile phones", "mobile communication devices", "mobile computing devices", "digital tablets", "smart phones", "subscriber devices", "user equipment", among other devices. The term "cloud" may be used herein to refer to a domain, group, etc., of devices providing certain functionality/resources such as computational, networking, storage, and content delivery. The terms "layer(s)", "strata", and "stratum" may be interchangeably used to refer to segments of a communication network that individually play generally distinct roles, but are not necessarily considered layers of a protocol stack, and that together provide the functions and services for communication between endpoint users and services, such as between a device and a service offered by a service provider. The term "node" may be used herein to refer to a function, module, circuit, etc., which may be an end point or a redistribution point for data, signals, messages, transmissions, etc., and which in general may be a function, module, circuit, etc. that is programmed, designed, or engineered to receive, process, and/or transmit data, signals, messages, transmissions, etc., from and/or to other nodes.

FIG. 1 is a reference wireless network architecture 100 that enables devices to access services where functions are divided across different strata. This exemplary wireless network architecture 100 may include three strata: a service stratum 102, a connectivity stratum 104, and an access stratum 106. The connectivity and flow of information between the various strata 102, 104, 106 and a user device (UE) 108 is illustrated. In one exemplary implementation, the service stratum 102 may be operated and/or managed independent of the connectivity stratus 104 and/or the access stratum 106. That is, while the service stratum 102 may communicate over the connectivity stratum 104, they may be independently operated. Consequently, contractual relationships may be established between service providers 110 at the service stratum 102 and a connectivity stratum provider.

The service stratum 102 may host credentials for devices/subscribers and may provide service(s) and/or also may host application server(s) for services. For instance, the service stratum may maintain a billing relationship with the connectivity stratum 104 (and optionally devices/subscribers that gain access to the wireless network via the access stratum 106).

The connectivity stratum 104 may host sessions (e.g., links, connections, data flows/streams, etc.) for devices to carry services over the connectivity stratum 104 and access stratum 106. It may also enforce subscription limits defined by the service stratum 102.

The access stratum 106 may host radio access network (RAN) that facilitate access for one or more devices 108 that wish to communicate over the wireless network. It may also enforce subscription limits defined by the connectivity stratum 104.

The device 108 may host credentials for the service stratum 102 and may connect to services hosted by service providers 110 represented in the service stratum 102. Service providers may include, for example, online retailers 110A, social connectivity websites 110B, video streaming services 110C, voice over internet protocol (IP) or VOIP services 110D, etc. The device 108 may access the services via the access stratum 106 (via a radio access network 120) and the connectivity stratum 104.

In one aspect, the methods and apparatus described herein may relate to how connectivity providers, operating core networks CN-A 112, CN-B 114, CN-C 116 in the connectivity stratum 104, and/or access stratum providers, operating one or more radio access networks 120, can cooperate and communicate network utilization and/or congestion information to service providers 110A, 110B, 110C, 110D in the service stratum 102. For many current networks, congestion information is limited to the radio access network (RAN) 120 (at the access stratum 106) and is only used to manage the quality of service (QoS) received by services and admission control, rather than being used for network selection management by the device 108 and/or a service manager 122 in a service provider of the service stratum 102 or network.

According to one aspect, congestion information for the access stratum 106 and/or connectivity stratum 104 may serve to dynamically adjust service parameters, which are then provided to a service manager 122. The service manager 122 may use the adjusted service parameters received to modify its operating behavior.

Figure 2:
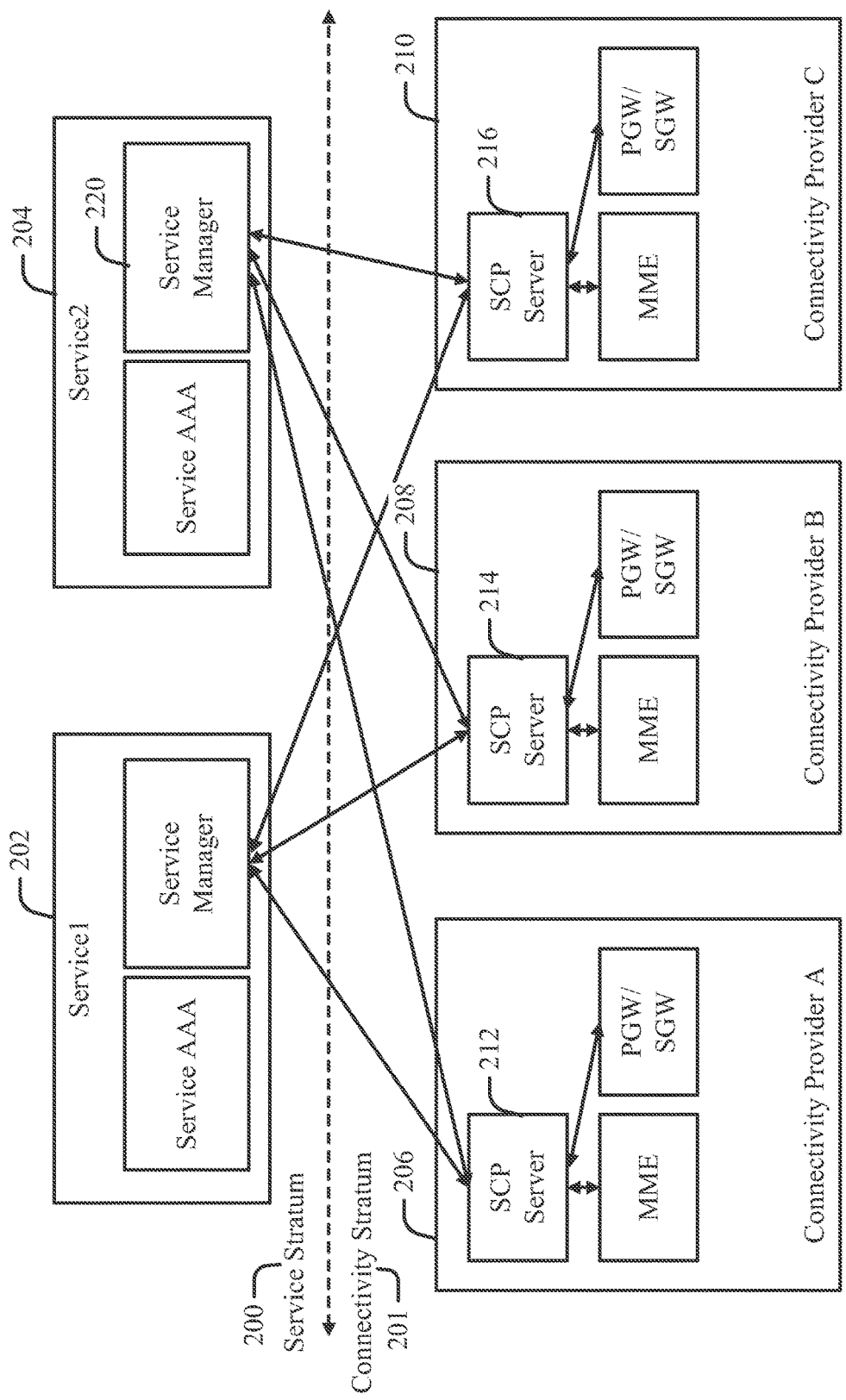
FIG. 2 is a block diagram illustrating relationships between a service stratum and a connectivity stratum.

FIG. 2 is a block diagram illustrating exemplary relationships between a service stratum 200 and a connectivity stratum 201. The service stratum 200 may include one or more service providers for each service 202 and 204 provided over a network (e.g., wireless network, packet switched network, subscriber network, etc.). Each service 202 and 204 may have a Service Manager 220 responsible for establishing and maintaining contracts with connectivity providers 206, 208, and 210 operating at the connectivity stratum 201. The Service Manager communicates with the connectivity stratum 201 via a Service Connectivity Protocol (SCP). SCP Servers 212, 214, 216 in the connectivity stratum 201 know the local connectivity services and configuration of each provider 206, 208, and 210.

Figure 3:
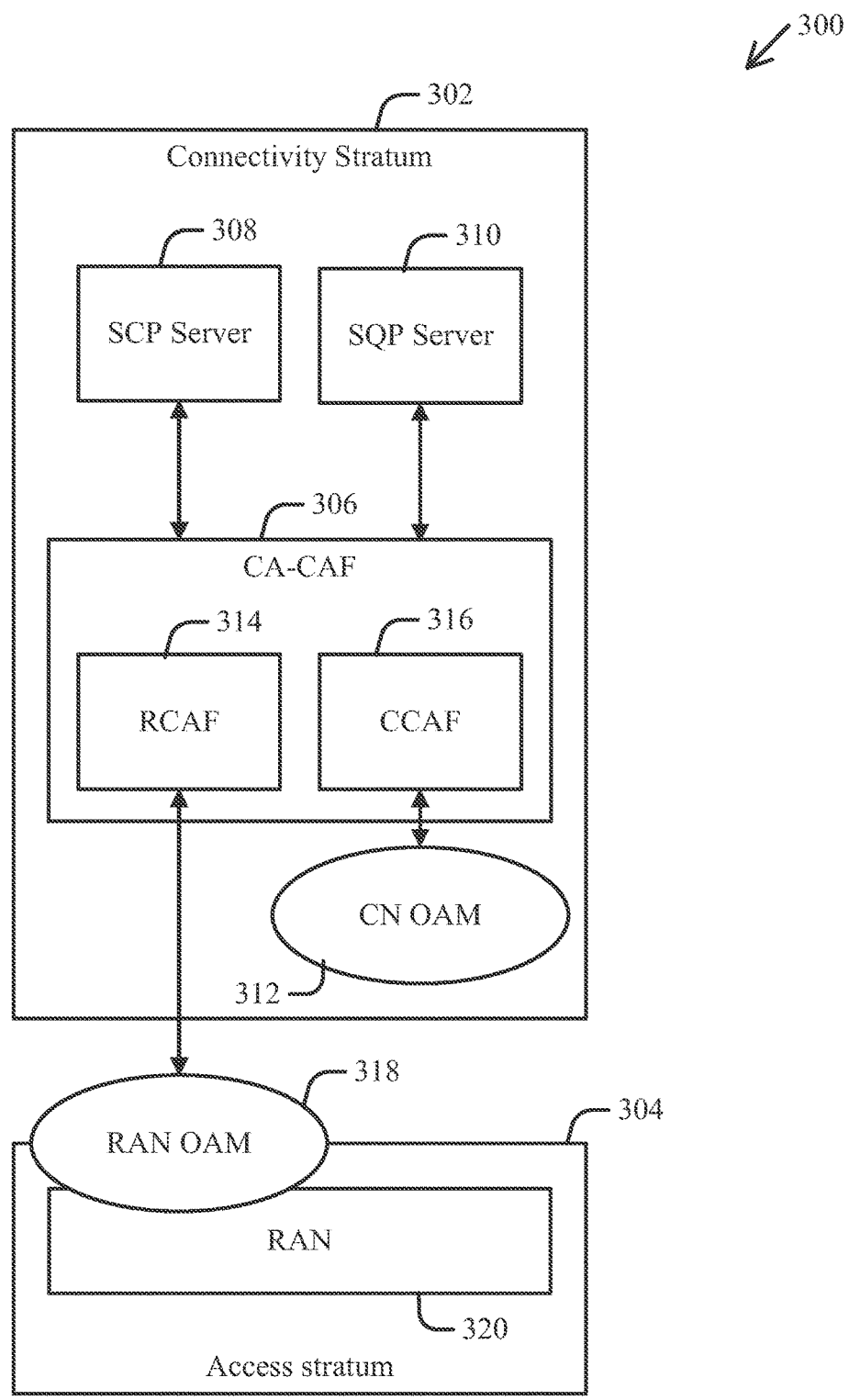
FIG. 3 is a block diagram illustrating a Connectivity and Access Congestion Awareness Function (CA-CAF), at the connectivity stratum, connected to a Service Connectivity Protocol (SCP) server and a Service Query Protocol (SQP) server.

FIG. 3 is a block diagram illustrating a Connectivity and Access Congestion Awareness Function (CA-CAF) 306, at the connectivity stratum 302, connected to a Service Connectivity Protocol (SCP) server 308 and a Service Query Protocol (SQP) server 310.

The CA-CAF 306 is an element that provides connectivity stratum 302 and access stratum 304 Congestion Information (CACI) to the SCP server 308 and SQP server 310 to enable the SCP server 308 and SQP server 310 to take the current connectivity stratum 302 and access stratum 304 congestion status and/or utilization information into account for decisions related to managing and hosting different services (e.g., from a service stratum). The service connectivity protocol (SCP) server 308 facilitates establishing relationships, agreements, or contracts for services between parties in the service stratum and/or the connectivity/access strata. The Service Query Protocol (SQP) server 310 enables the user device to discover the service providers and other service information for the serving network which serves a network access point (e.g., eNB) or access node.

The CA-CAF 306 may include a radio access network (RAN) congestion awareness function (RCAF) 314 and a CN congestion awareness function (CCAF) 316. Similar to the RCAF 314, the CCAF 316 may collect information related to one or both of control plane and user plane congestion from the core network's (CN) Administration and Maintenance (OAM) 312, based on which the CCAF determines the congestion level (and the identifier) of a mobility management entity (MME) or PGW/SGW or other network nodes (e.g. SGi local area network (LAN) equipment).

The connectivity/access stratum congestion information (CACI) may include the following information: (a) a Node ID identifying the connectivity and access stratum elements impacted by congestion, (b) congestion level or an indication of the "no congestion" state, (c) services, applications or traffic type identifiers (e.g. IP traffic type, destination domain, etc.) for which congestion information is reported. In the case where the connectivity stratum and/or access stratum balances the loading based on this information, e.g., different costs may be advertised to each service/application/traffic type to balance the load since different services will load different parts of the network due to signaling or data service requirements.

The CA-CAF 306 may provide congestion information to the SCP server 308 to enable dynamic load balancing with service stratum as well as the SQP server 310 to enable dynamic network and service selection at the device. The congestion information may enable the connectivity stratum 302 and the access stratum 304 to use yield management to increase or decrease network loading, e.g., based on increasing or decreasing the advertised cost to the service stratum or device based on connectivity and/or access strata network congestion and/or utilization.

Within the scope and functionality of this network 300, service providers, e.g., 110A, 110B, 110C, 110D are able to dynamically and/or automatically negotiate service contracts for use of the network over the access stratum 304 and/or connectivity stratum 302.

One aspect that enables the service connectivity protocol (SCP) is the abstraction of services to allow each stratum to parameterize the capabilities needed in lower stratums to enable the service, so the service can be described in terms of service parameters. Service parameters define the requirements for the service in terms of connectivity and access strata performance and capabilities. The service stratum provides the service parameters when the service is negotiated with the connectivity stratum. The connectivity stratum and the access strata configure the service based on the service parameters and their respective stratum capabilities. Examples of service parameters are illustrated in Table 1.

TABLE 1

| Stratum | Example Service Parameters |
|---|---|
| Service | Cloud/content/storage requirements, processing requirements, IP multimedia subsystem IMS services (E911, short message service SMS, etc.) |
| Connectivity | QoS (per flow, per bearer, etc.), IPv4/IPv6 (public/NAT options for IPv4), ANDSF policies, time and usage based limits, security/credentials |
| Access | RAT supported, coverage limits, device capabilities, delivery method e.g. unicast/broadcast/multicast |

According to one aspect, the Service Query Protocol (SQP) enables a user device to discover service providers and other service information for a serving network of an access point. The Service Query Protocol (SQP) may be run once per network identifier (up to a validity time) in order to determine if it has a valid subscription, or to provision a new subscription at new/unrecognized network, i.e., if the device queries the services for a public land mobile network (PLMN) identifier (ID) at a first access point, then it can assume the same services are available at other access point in the area advertising the same PLMN ID up to some granularity, e.g., tracking area code (TAC). The SQP may also include support for subscription identification (name, icon) and information for types of provisioning available to provision a new subscription at new/unrecognized network. The SQP may run over an unauthenticated NAS or RRC connection in order to enable a device to determine whether a valid subscription exists for this network identifier, or to determine which subscriptions can be provisioned for this network identifier. The SQP may be used to provide information to user devices instead of or in addition to using system information blocks (SIB) to make it easier to extend to support future requirements and services.

Each network (mobility management entity (MME) for non-access stratum (NAS) for Radio Resource Control (RRC)) is configured with one or multiple service providers and/or mobile network operators (MNOs) which provide access via this network. For each service provider/MNO, necessary information about how to obtain access is configured or available (e.g. via domain name service (DNS) lookup, etc.): (a) service provider identification (name, icon), (b) type of authentication, (c) Authentication Authorization and Accounting (AAA) Server information, (d) availability of online sign-up (OSU), and (e) OSU Server information. This information may be available to the user device via a SQP query/response.

In one example, an access network (AN) identifier (ID) may be broadcast over the air, i.e., the user device is not required to connect to identify the network. The AN ID may indicate the owner of the radio access network (RAN) (i.e., the access point) or the service provider.

The AN ID may implicitly indicate the deployment model based on the type of network identifier, (e.g. a PLMN ID indicates a traditional operator, whereas a different identifier may indicate a network not associated with a PLMN ID, i.e., a non-traditional network operator such as a HotSpot operator), or explicitly indicate that it contains an indication of the network type.

An access points may support network identifiers, e.g., private and public use, as well as for RAN sharing. For example, the access point should be able to advertise multiple access networks as for RAN sharing, but also may be able to advertise a secondary ID, similar to CSG ID to indicate a private access network that is also part of a public access network. Each AN ID may be associated with a separate SQP server. An access node is not required to be associated with a PLMN in order to support non-operator deployments. For example, the access point can advertise an alternative ID to identify the access network provider. This alternative ID may be similar to a service set identifier (SSID) in that it is not a managed ID and so may not be unique to the access network.

Exemplary Approach to the CA-CAF Indicating Congestion Level to the SCP Server

Figure 4:
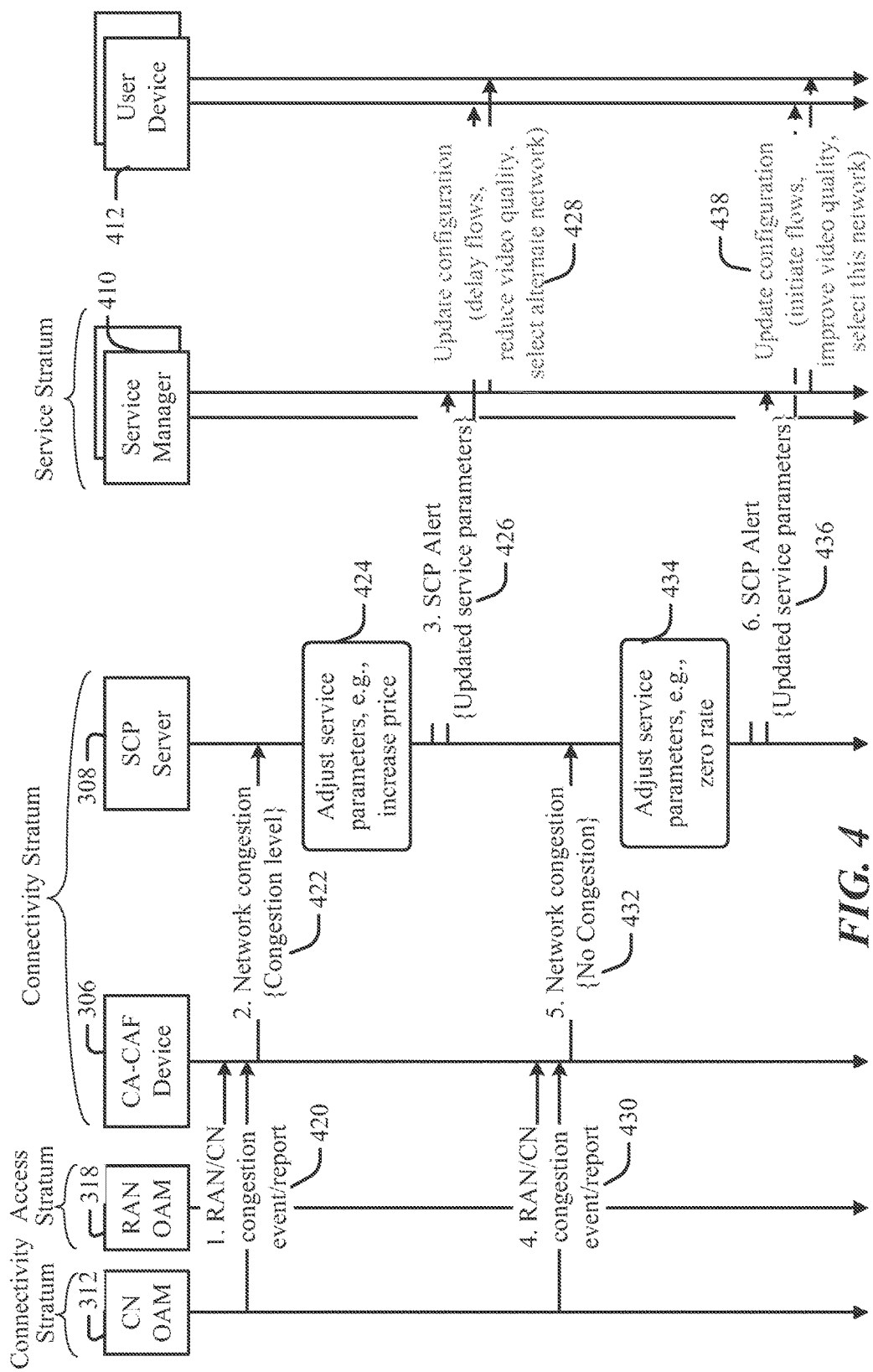
FIG. 4 illustrates an exemplary procedure for the CA-CAF to indicate a congestion level to the SCP server, where the SCP server may use the congestion level to update a service manager (operating at the service stratum) with new parameters based on the congestion level.

FIG. 4 illustrates an exemplary procedure for the CA-CAF 306 to indicate a congestion level to the SCP server 308, where the SCP server 308 may use the congestion level to update a service manager 410 (operating at the service stratum) with new parameters based on the congestion level.

The RAN Operations, Administration and Maintenance (OAM) 318 and CN OAM 312 provide periodic or event based congestion reports 420 to the CA-CAF 306 (e.g., the RCAF 314 and the CCAF 316 functions, respectively). In one example, the congestion reports 420 may be specific to a given area (e.g., within a tracking area, a geo-location, or a cell level) or a radio access technology (RAT) (e.g., Long Term Evolution (LTE), Universal Mobile Telecommunications System (UMTS), or wireless local area network (WLAN)). Therefore, the service parameters derived in step 424 may also be specific to the corresponding area and may only impact services in those particular areas.

The CA-CAF 306 determines, based on the RCAF and CCAF functions, that the congestion level of the access or connectivity stratum has changed and indicates the updated congestion level 422 to the SCP server 308 in a CACI message.

The SCP server 308 may adjust the service parameters 424 based on the congestion level for the connectivity and/or access stratum. For example, if the congestion level increases, the SCP server 308 may increase the cost for providing the service over the network. Note that the congestion level may impact which services are affected, e.g., high signaling congestion and low data congestion may impact voice services prices more than streaming services.

The SCP server 308 may alert 426 the various service managers 410 of the updated parameters, e.g., it publishes an updated version of the advertised service parameters to all service managers that are subscribed.

Optionally, the service managers 410 may update 428 the device 412 configurations to reflect the new parameters. For example, device 412 streaming or downloading content may be redirected, based on the information defined in the SCP service parameters such as congestion, to start fetching the content from somewhere else. In this case, the service manager 410 in the service stratum may even configure a new or additional connectivity stratum to cache the content instead of accessing the content remotely via that particular stratum. In another example, the updated device configuration may include new cost information for the device to use in making a decision on network selection as to where to access a particular service.

Similarly, when congestion level is reduced over the connectivity stratum and/or access stratum, the RAN OAM 318 and CN OAM 312 provide periodic or event based congestion reports 430 to the CA-CAF 306 (e.g., the RCAF 314 and the CCAF 316 functions, respectively). The CA-CAF 306 determines, based on the RCAF and CCAF functions, that the congestion level of the access or connectivity stratum has changed (e.g., no congestion) and indicates the updated congestion level 432 to the SCP server 308 in a CACI message. The SCP server 308 adjusts the service parameters 434 based on the congestion level. The SCP server 308 may alert 436 the various service managers 410 of the updated parameters. Optionally, the service managers 410 may update 438 the device 412 configurations to reflect the new parameters.

Exemplary Approach to the CA-CAF indicating Congestion Level to the SQP Server

Figure 5:
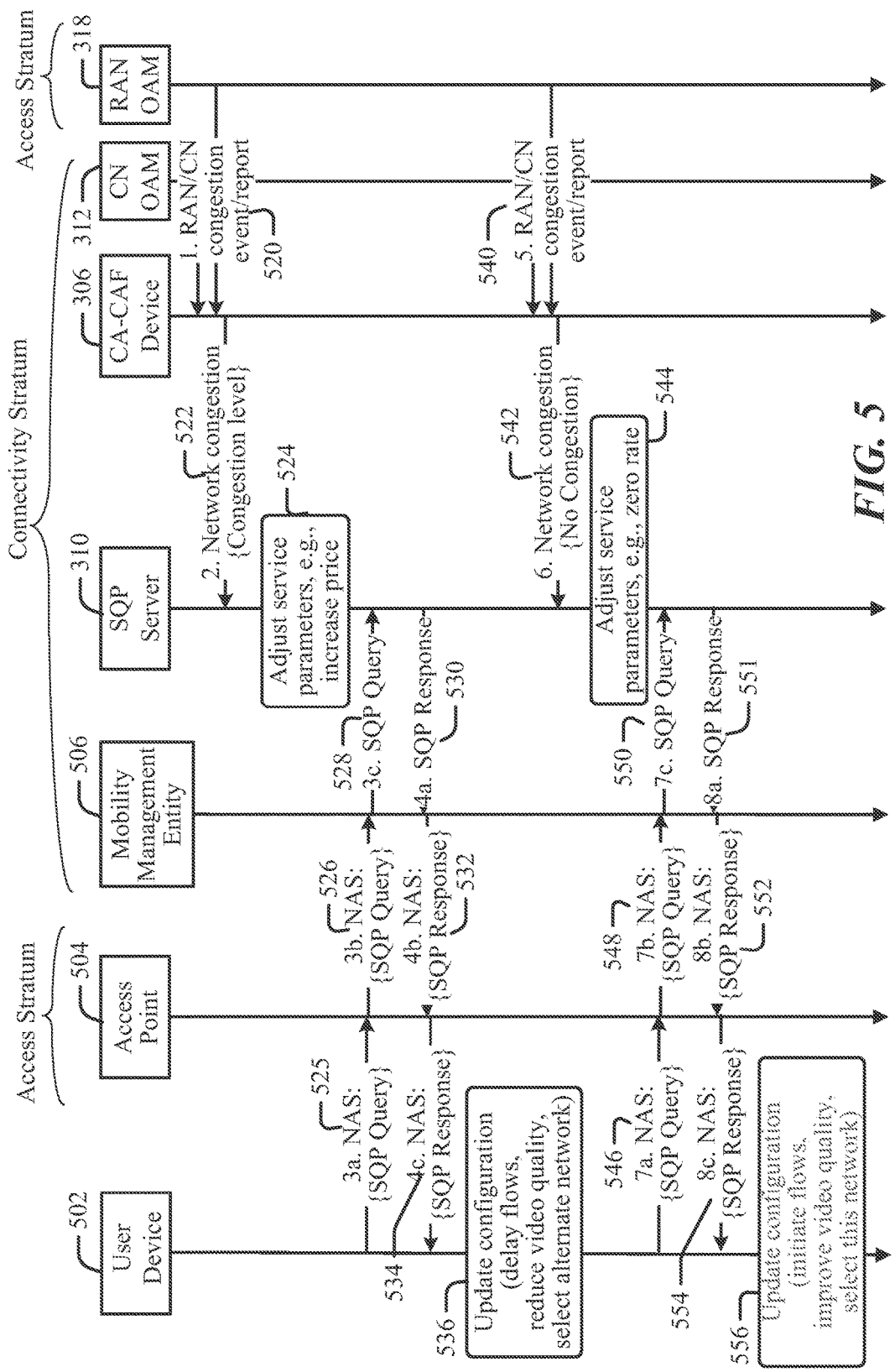
FIG. 5 illustrates an exemplary procedures for the CA-CAF to indicate a congestion level to the SQP server, where the SQP server uses the congestion level to provide service parameters to the user device when the user device queries the connectivity stratum for available service information.

FIG. 5 illustrates an exemplary procedures for the CA-CAF 306 to indicate a congestion level to the SQP server 310, where the SQP server 310 uses the congestion level to provide service parameters to the user device 502 when the user device 502 queries the connectivity stratum 302 for available service information.

The RAN OAM 318 and CN OAM 312 may provide periodic or event based congestion reports 520 to the RCAF 314 and CCAF 316 functions, respectively.

The CA-CAF 306 determines, based on the RCAF 314 and CCAF 316 functions, that the congestion level of the access stratum 304 or connectivity stratum 302 has changed and indicates 522 the updated congestion level to the SQP server 310 in a CACI message.

The SQP server 310 may adjusts the service parameters 524 based on the congestion level. For example, if the congestion level increases, the SQP server 310 will increase the cost for providing the service. Note that the congestion level may impact which services are affected, e.g., high signaling congestion and low data congestion may impact voice services prices more than streaming services. In some cases, the SQP server 310 may even indicate a service is not currently available at the connectivity provider.

The user device 502 may send an SQP query 525, 526, and 528, over non-access stratum (NAS), including a request for information for service discovery to determine the service information. The SQP server 310 returns an SQP Response 530, 532, and 534 including any relevant SQP elements to the user device 502. The user device 502 may perform additional Query and Response exchanges with the SQP server 310 or alternatively perform additional Query and Response exchanges with another SQP server associated with a network access point by using a different AN ID.

The user device 502 updates its configuration 536 to reflect the new parameters, e.g., the device delays flows, reduces video quality or selects an alternative network if the cost has increased beyond a user or service specific configuration.

A similar series of steps may occurs when the congestion level is reduced. For instance, when congestion level is reduced, the RAN OAM 318 and/or CN OAM 312 provide periodic or event based congestion reports 540 to the CA-CAF 306 (e.g., the RCAF 314 and the CCAF 316 functions, respectively). The CA-CAF 306 determines, based on the RCAF and CCAF functions, that the congestion level of the access or connectivity stratum has changed (e.g., no congestion) and indicates the updated congestion level 542 to the SQP server 310. The SQP server 310 adjusts the service parameters 544 based on the congestion level.

The user device 502 may send an SQP query 546, 548, and 550, over NAS, including a request for information for service discovery to determine the service information. The SQP server 310 returns a SQP Response 551, 552, and 554 including any relevant SQP elements to the user device 502. The user device 502 may perform additional Query and Response exchanges with the SQP server 310 or alternatively perform additional Query and Response exchanges with another SQP server associated with a network access point by using a different AN ID.

Exemplary Network Device/Node and Method Operational Therein

Figure 6:
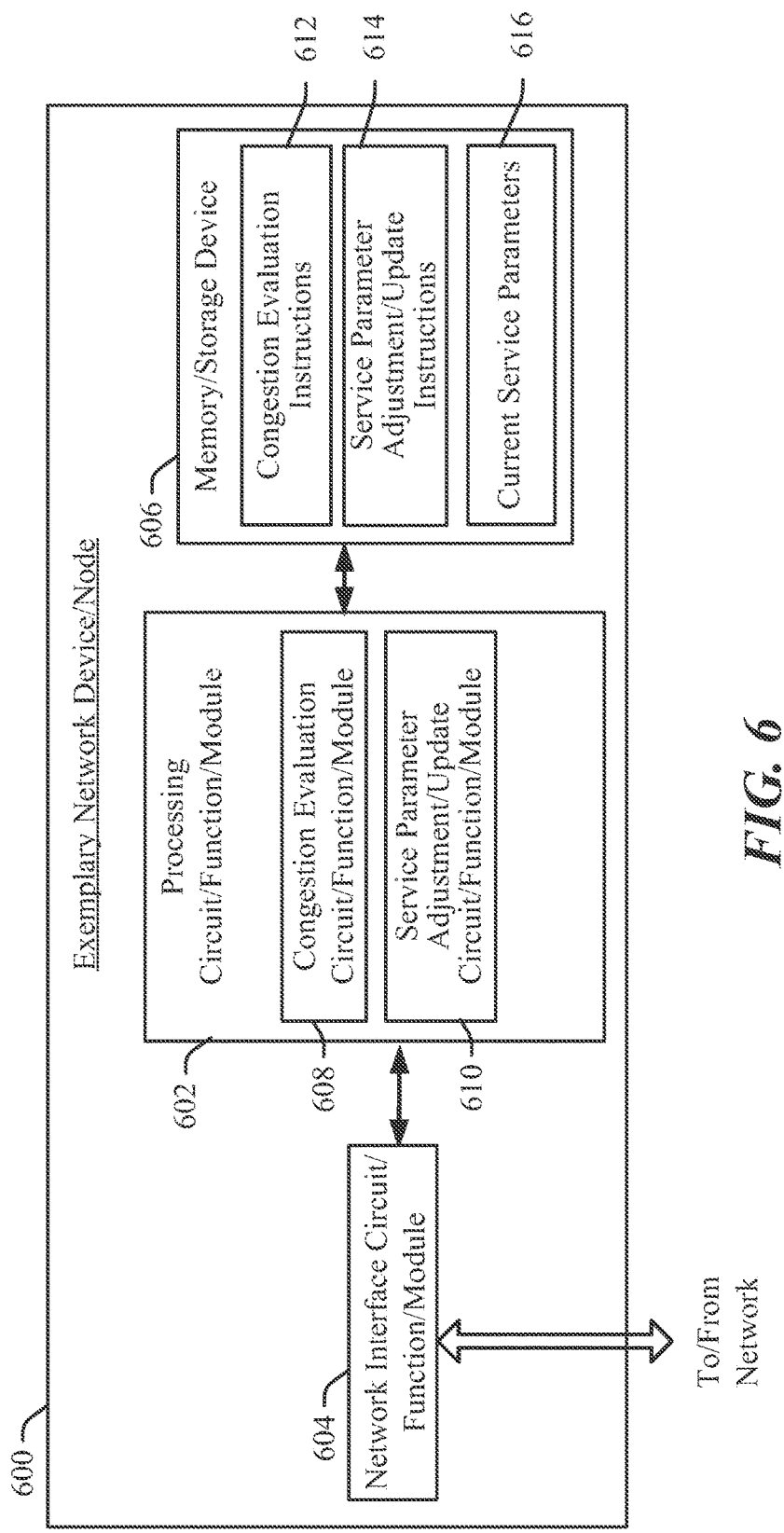
FIG. 6 is a block diagram of an exemplary network device or node 600 configured to obtain congestion information for a connectivity stratum and/or access stratum and provide adjusted service parameters to a service stratum.

FIG. 6 is a block diagram of an exemplary network device or node 600 configured to obtain congestion information for a connectivity stratum and/or access stratum and provide adjusted service parameters to a service stratum. The network device 600 may include a processing circuit, function, module 602 coupled to a network interface circuit, function, or module 604, and a memory/storage device 606. In one example, the network interface circuit, function, module 604 may serve to couple the network device/node 600 to a network. In one example, the network may be a multi-strata network including a connectivity stratum, an access stratum, and a service stratum.

The processing circuit, function, module 602 may include a congestion evaluation circuit, function, module 608 that obtains congestion information for a connectivity stratum and/or an access stratum of the network. For instance, the congestion evaluation circuit, function, module 608 may obtain an indication that a congestion level for at least one of a radio access network node and a core network node of a network has changed.

The processing circuit, function, module 602 may also include a service parameter adjustment or update circuit, function, module 610. In one example, the service parameter adjustment or update circuit, function, module 610 that adjusts or updates one or more service parameters for services at a service stratum of the network based on the congestion information obtained. For instance, the service parameter adjustment or update circuit, function, module 610 may be configured to update one or more service parameters for a plurality of services, operating at a service stratum, on a per service basis based on the congestion level indication.

The memory/storage device 606 may include congestion evaluation instructions 612, and/or service parameter adjustment/update instructions 614 that may be executed by the processing circuit, function, module 602 to perform its functions. Additionally, the memory/storage device 606 may also include a current set of service parameters 616 that may be provided to, at least one of, a node operating at the service stratum or a user device that obtains services over the network. For instance, the adjusted/updated service parameters for the node operating at the service stratum or the user device may be provided/sent over the network interface 604.

Figure 7:
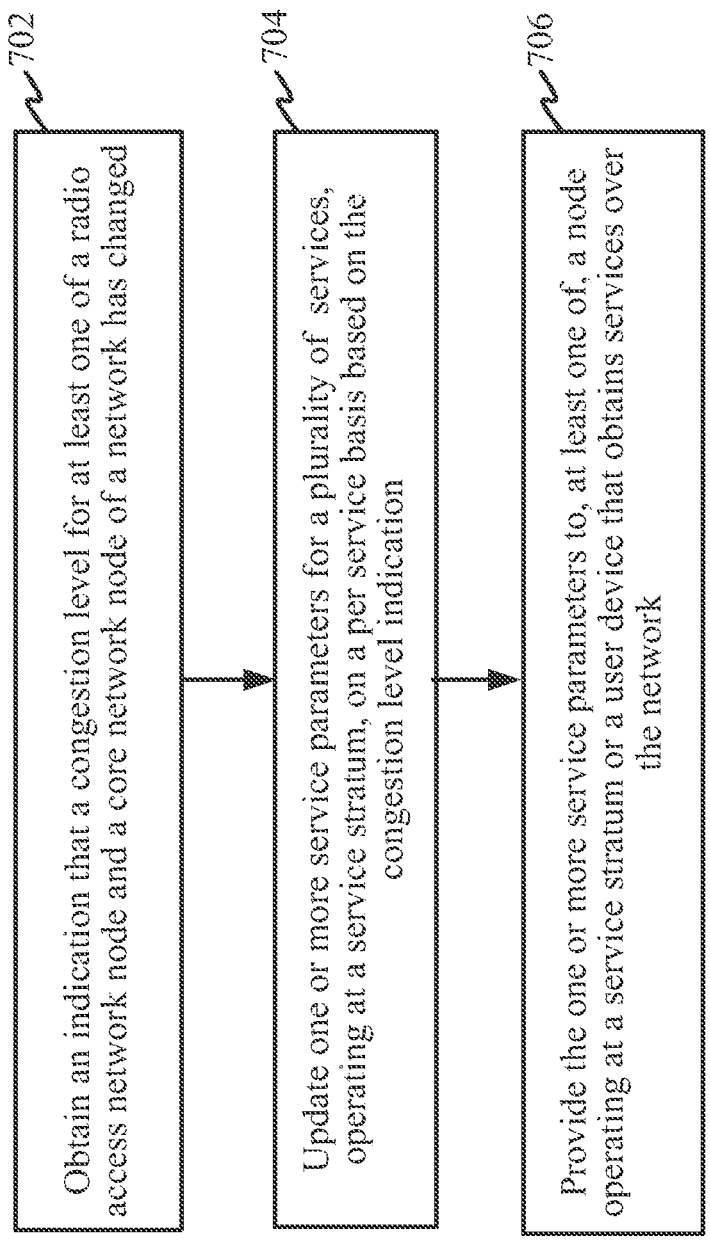
FIG. 7 illustrates a method operational at a network device, such as a SCP server and/or a SQO server.

In various implementations, the network device or node 600 may implement one or more of the steps illustrated in FIGS. 4, 5, 7, and/or 8.

FIG. 7 illustrates a method operational at a network device, such as a SCP server and/or a SQO server. An indication may be obtained that a congestion level for at least one of a radio access network node and a core network node of a network has changed 702. In one example, the congestion level indication may be based on at least two different types of congestion. For instance, the congestion level indication may be based on at least an access stratum congestion and a connectivity stratum congestion for the network. In another example, the congestion level indication may be based on at least a physical resource congestion (e.g., wireless link resources) for the radio access network node and a control or signaling traffic congestion (e.g., processing and/or backhaul) for the core network node.

One or more service parameters for a plurality of services, operating at a service stratum, may be adjusted or updated on a per service basis based on the congestion level indication 704. Updating the one or more service parameters may be performed by a second network device distinct from the network device. In one example, the one or more service parameters may be updated only if the obtained congestion level indication has changed more than a threshold amount from a previously reported congestion level. In various examples, the plurality of services may include two or more of: a voice service, a video service, audio/content streaming service, and a web browsing service.

The one or more service parameters may then be provided (e.g., conveyed, sent, or transmitted) to, at least one of, a node operating at a service stratum or a user device that obtains services over the network 706. The one or more service parameters may be provided or sent in response to a query from the node operating at the service stratum and/or the user device. In one example, updating the one or more service parameters for the plurality of services on a per service basis includes: (a) updating a first service parameter for a first service a first amount; and (b) updating a second service parameter for a second service a second amount distinct from the first amount. That is, different services on the network may be adjusted differently (e.g., to different extents or amounts).

In one example, obtaining the congestion level indication may further include: (a) obtaining a first network congestion report from the radio access network node; (b) obtaining a second network congestion report from the core network node; and/or (c) determining, based on the first network congestion report and the second network congestion report, the congestion level indication.

Figure 8:
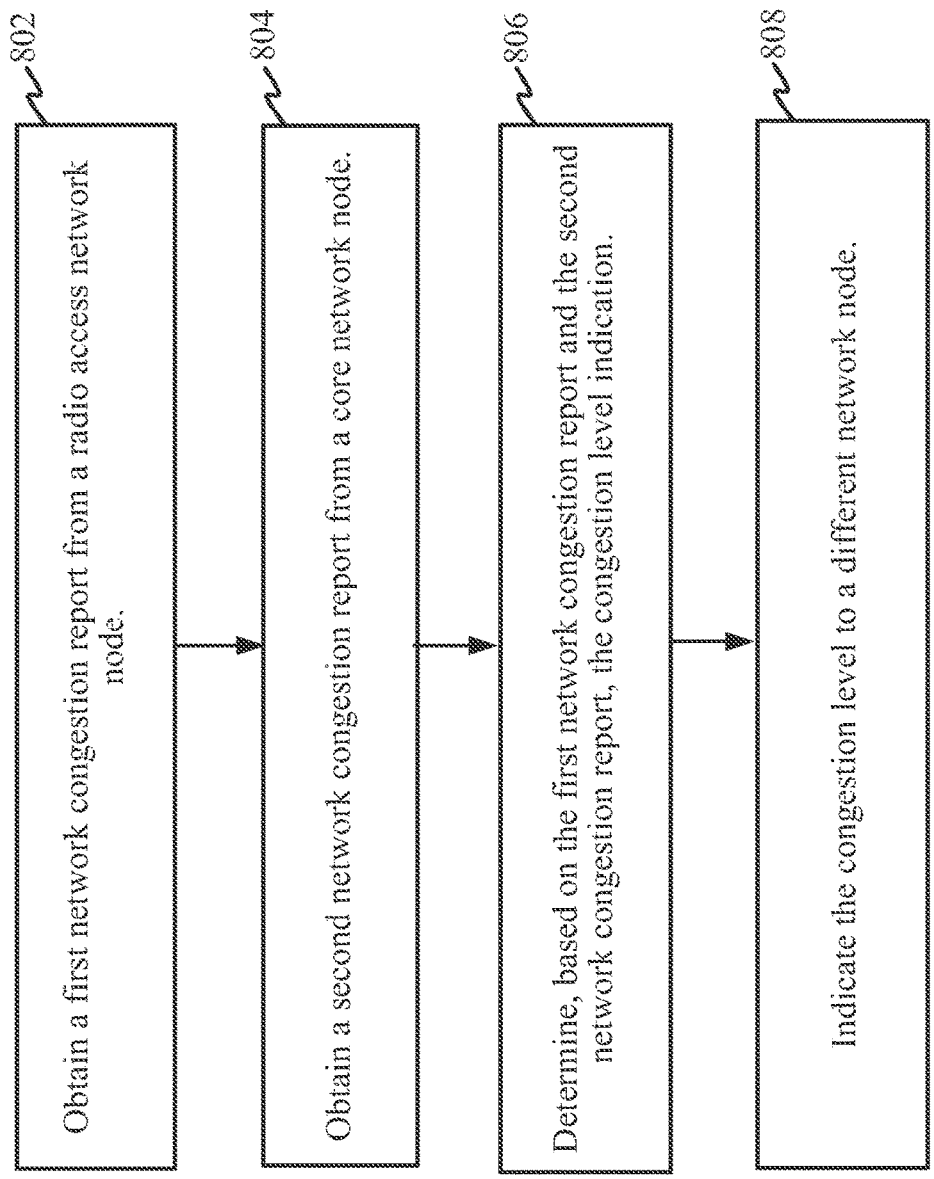
FIG. 8 illustrates a method operational at a network device, such as a CA-CAF server.

FIG. 8 illustrates a method operational at a network device, such as a CA-CAF server. A first network congestion report may be obtained from a radio access network (RAN) node of a network 802. A second network congestion report may be obtained from a core network (CN) node of the network 804. The network may be a multi-strata network including a connectivity stratum, an access stratum, and a service stratum. A network congestion level indication may be determined based on the first network congestion report and the second network congestion report 806. The congestion level may then be indicated (e.g., conveyed, sent, or transmitted) to a different network node 808. The different network node may be responsible for providing one or more service parameters to, at least one of, a node operating at the service stratum or a user device that obtains services over the network. In some examples, the first network congestion report may include one or more of: supported radio access technologies coverage limits for the network, device capabilities, and/or delivery methods available over the network. In other examples, the second network congestion report may include one or more of: quality of service information for the network, support for IPv4 and IPv6, network policies, time and usage based limits, and/or security and/or credentials. The congestion level may only be indicated to the different network node (e.g., node operating at the service stratum) if the determined network congestion level has changed more than a threshold amount from a previous network congestion level.

One or more of the components, steps, aspects, and/or functions illustrated in the figures may be rearranged and/or combined into a single component, step, aspect, or function or embodied in several components, steps, or functions. Additional elements, components, steps, and/or functions may also be added without departing from novel aspects disclosed herein. The apparatus, devices, and/or components illustrated in the figures may be configured to perform one or more of the methods, aspects, or steps described in the figures. The novel algorithms described herein may also be efficiently implemented in software and/or embedded in hardware.

Also, it is noted that the examples may be described as a process depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines, and/or devices.

Furthermore, examples may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, erasable programmable ROM (EPROM) memory, erasable programmable ROM (EEPROM) memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the examples disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various aspects of the examples described herein can be implemented in different systems without departing from the scope of the disclosure. It should be noted that the foregoing examples are merely examples and are not to be construed as limiting the invention. The description of the examples is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a network device for managing network congestion, comprising:
    obtaining a first congestion information for a radio access network node operating at an access stratum of a network;
    obtaining a second congestion information for a core network node operating at a connectivity stratum of the network;
    determining, based on the first congestion information and the second congestion information, that a congestion level of the access stratum, or connectivity stratum, or both has changed; and
    indicating an updated congestion level to a connectivity stratum server that provides service level information to a service stratum, where the service level information includes updated service costs, as a function of the congestion level, for providing a plurality of services over the network.

2. The method of claim 1, wherein the access stratum includes a radio access network that enables a user device to communicate with the network, and the connectivity stratum includes at least one core network configured to host a session for the user device to carry at least one of a plurality of services over the connectivity stratum and the access stratum.

3. The method of claim 2, wherein the congestion level is based on at least a physical resource congestion for the radio access network node and a control or signaling traffic congestion for the core network node.

4. The method of claim 1, wherein the service costs are updated only if the congestion level of the access stratum and/or connectivity stratum has changed more than a threshold amount from a previous congestion level.

5. The method of claim 1, wherein the plurality of services include two or more of: a voice service, a video service, audio/content streaming service, and a web browsing service.

6. The method of claim 1, wherein the congestion level of the access stratum and/or connectivity stratum is based on at least two different types of congestion.

7. The method of claim 1, wherein the updated service costs include an adjusted first cost of a first service while leaving a second cost of a second service unchanged.

8. The method of claim 1, wherein the updated service costs include an adjusted first cost of a first service that is adjusted more than an adjusted second cost of a second service.

9. A network device, comprising:
    a network interface for communicating over a network;
    a processing circuit coupled to the network interface and configured to:
        obtain a first congestion information for a radio access network node operating at an access stratum of the network;
        obtain a second congestion information for a core network node operating at a connectivity stratum of the network;
        determine, based on the first congestion information and the second congestion information, that a congestion level of the access stratum, or connectivity stratum, or both has changed; and
        indicate an updated congestion level to a connectivity stratum server that provides service level information to a service stratum, where the service level information includes updated service costs, as a function of the congestion level, for providing a plurality of services over the network.

10. The network device of claim 9, wherein the access stratum includes a radio access network that enables a user device to communicate with the network, and wherein the connectivity stratum includes at least one core network configured to host a session for the user device to carry at least one of a plurality of services over the connectivity stratum and the access stratum.

11. The network device of claim 10, wherein the congestion level is based on at least a physical resource congestion for the radio access network node and a control or signaling traffic congestion for the core network node.

12. The network device of claim 9, wherein the service costs are updated only if the congestion level of the access stratum and/or connectivity stratum has changed more than a threshold amount from a previous congestion level.

13. The network device of claim 9, wherein the plurality of services include two or more of: a voice service, a video service, audio/content streaming service, and a web browsing service.

14. The network device of claim 9, wherein the congestion level of the access stratum and/or connectivity stratum is based on at least two different types of congestion.

15. A network device, comprising:
    means for obtaining a first congestion information for a radio access network node operating at an access stratum of a network;

means for obtaining a second congestion information for a core network node operating at a connectivity stratum of the network;

means for determining, based on the first congestion information and the second congestion information, that a congestion level of the access stratum, or connectivity stratum, or both has changed; and means for indicating an updated congestion level to a connectivity stratum server that provides service level information to a service stratum, where the service level information includes updated service costs, as a function of the congestion level, for providing a plurality of services over the network.

16. The network device of claim 15, wherein the access stratum includes a radio access network that enables a user device to communicate with the network, and the connectivity stratum includes at least one core network configured to host a session for the user device to carry at least one of a plurality of services over the connectivity stratum and the access stratum.

17. The network device of claim 16, wherein the congestion level is based on at least a physical resource congestion for the radio access network node and a control or signaling traffic congestion for the core network node.

18. A non-transitory machine-readable storage medium having one or more instructions which when executed by a processing circuit causes the processing circuit to:

obtain a first congestion information for a radio access network node operating at an access stratum of a network;

obtain a second congestion information for a core network node operating at a connectivity stratum of the network;

determine, based on the first congestion information and the second congestion information, that a congestion level of the access stratum, or connectivity stratum, or both has changed; and indicate an updated congestion level to a connectivity stratum server that provides service level information to a service stratum, where the service level information includes updated service costs, as a function of the congestion level, for providing a plurality of services over the network.

19. The non-transitory machine-readable storage medium of claim 18, wherein the access stratum includes a radio access network that enables a user device to communicate with the network, and the connectivity stratum includes at least one core network configured to host a session for the user device to carry at least one of a plurality of services over the connectivity stratum and the access stratum.

20. The non-transitory machine-readable storage medium of claim 19, wherein the congestion level is based on at least a physical resource congestion for the radio access network node and a control or signaling traffic congestion for the core network node.

* * * * *